US012089601B2

(12) United States Patent
Van Blokland

(10) Patent No.: US 12,089,601 B2
(45) Date of Patent: Sep. 17, 2024

(54) DEVICE AND METHOD FOR CUTTING A DOUGH PIECE

(71) Applicant: Radie B.V., BC Culemborg (NL)

(72) Inventor: Johannes Josephus Antonius Van Blokland, BG Laren (NL)

(73) Assignee: RADIE B.V., BC Culemborg (NL)

( * ) Notice: Subject to any disclaimer, the term of this patent is extended or adjusted under 35 U.S.C. 154(b) by 909 days.

(21) Appl. No.: 17/149,361

(22) Filed: Jan. 14, 2021

(65) Prior Publication Data
US 2021/0219557 A1   Jul. 22, 2021

(30) Foreign Application Priority Data

Jan. 16, 2020   (EP) .................................... 20152160

(51) Int. Cl.
| | | |
|---|---|---|
| A21C 11/10 | (2006.01) | |
| A21C 9/08 | (2006.01) | |
| B26D 3/24 | (2006.01) | |
| B26D 7/06 | (2006.01) | |

(52) U.S. Cl.
CPC .............. *A21C 9/085* (2013.01); *A21C 11/10* (2013.01); *B26D 3/24* (2013.01); *B26D 7/0625* (2013.01)

(58) Field of Classification Search
None
See application file for complete search history.

(56) References Cited

U.S. PATENT DOCUMENTS

| | | | |
|---|---|---|---|
| 2,206,312 A  * | 7/1940 | Werner ................ | A23G 7/0018 83/881 |
| 4,266,112 A | 5/1981 | Niedermeyer | |
| 4,401,001 A  * | 8/1983 | Gerber .................. | B26F 1/3826 83/881 |

(Continued)

FOREIGN PATENT DOCUMENTS

| | | |
|---|---|---|
| EP | 0722661 A2 | 7/1996 |
| JP | 2014008543 A | 1/2014 |
| WO | 2015092935 A1 | 6/2015 |

OTHER PUBLICATIONS

European Search Report dated Aug. 14, 2020, from EP Application No. 20152160.6, 6 sheets.

*Primary Examiner* — Thor S Campbell
(74) *Attorney, Agent, or Firm* — KATTEN MUCHIN ROSENMAN LLP

(57) ABSTRACT

The present invention relates to a device for cutting a dough piece comprising; a first dough conveyor, for conveying at least one dough sheet in a direction of conveyance that extends in a length direction of the first conveyor; a cutting station, the cutting station comprises at least one module carrier, wherein; said module carrier carrying a cutting module, said module for cutting dough sheets passing underneath the cutting station, and; said module carrier is movable with at least a directional component in a width direction of the first conveyor, and to a method for cutting a piece of dough comprising the steps of: conveying at least one dough sheet on a conveyor; continuously cutting, with at least a directional component in the width direction of the conveyor, the at least one dough sheet comprising; wherein the cutting takes place with a plurality of cutting units, and; the cutting units are independently moved.

12 Claims, 2 Drawing Sheets

(56) References Cited

U.S. PATENT DOCUMENTS

| | | | | |
|---|---|---|---|---|
| 4,462,292 | A | * | 7/1984 | Pearl .................. B26D 3/14 |
| | | | | 83/692 |
| 4,854,205 | A | * | 8/1989 | Anderka ............... B26D 3/085 |
| | | | | 83/881 |
| 5,214,590 | A | * | 5/1993 | Schnetzer ............... B26F 1/38 |
| | | | | 83/56 |
| 5,365,816 | A | | 11/1994 | Rudy |
| 5,699,707 | A | * | 12/1997 | Campbell, Jr. ....... B26F 1/3826 |
| | | | | 198/689.1 |
| 5,775,189 | A | * | 7/1998 | Ikoma ................. B26F 1/3806 |
| | | | | 83/76.1 |
| 5,907,984 | A | * | 6/1999 | Herman, Jr. ........... B26D 11/00 |
| | | | | 83/100 |
| 6,681,669 | B1 | * | 1/2004 | Bogan ................ B26F 1/3826 |
| | | | | 83/940 |
| 9,307,773 | B2 | * | 4/2016 | van Blokland .......... B26D 1/60 |
| 9,346,627 | B2 | * | 5/2016 | Ullmer .................. B65G 43/10 |
| 11,406,108 | B1 | * | 8/2022 | Alatorre ................ A21C 11/10 |
| 2003/0047052 | A1 | * | 3/2003 | Merritt ................ A21C 11/103 |
| | | | | 83/564 |
| 2006/0062879 | A1 | * | 3/2006 | Anderson ................ A21C 3/06 |
| | | | | 426/502 |
| 2006/0162512 | A1 | * | 7/2006 | Nasu .................... B26F 1/3826 |
| | | | | 83/13 |
| 2009/0107314 | A1 | * | 4/2009 | Nasu .................... B26F 1/3826 |
| | | | | 83/403.1 |
| 2010/0011927 | A1 | * | 1/2010 | Lee ........................ B26F 3/002 |
| | | | | 83/100 |
| 2012/0000334 | A1 | * | 1/2012 | Cavagna ............. B26D 7/2635 |
| | | | | 83/522.24 |
| 2013/0000454 | A1 | * | 1/2013 | Miller ..................... B26D 1/08 |
| | | | | 83/13 |
| 2017/0305779 | A1 | * | 10/2017 | Valiani .................. C03B 33/027 |
| 2022/0142181 | A1 | * | 5/2022 | Van Blokland .......... A21C 9/08 |
| 2023/0329247 | A1 | * | 10/2023 | Cox ........................ A21C 5/00 |

* cited by examiner

DEVICE AND METHOD FOR CUTTING A DOUGH PIECE

BACKGROUND

The present invention relates to a device for cutting dough pieces, in particular for cutting sheets of dough.

Devices for cutting dough are known in the art. One type of cutters comprises a cutting blade, that is movable in a vertical direction toward and from above a conveyor belt transporting a dough sheet. This type of cutter is limited to make a cut perpendicular to a direction of conveyance of a dough sheet. A second type comprises a cutting wheel, positioned just above a conveyor belt, for providing a cut in the transport direction of the dough sheet. For cutting a sheet of dough in a more complex shape, it is known to utilize a cutting roller. Such a roller can for example be a roller comprising sharp knifes on its outer periphery, placed in or having a predetermined shape. By pressing the roller onto a sheet of dough, the predetermined shapes are cut out of the sheet of dough. This method of cutting is however limited. If the desired output shape of the cut dough pieces changes, the entire roller needs to be replaced with another roller having the desired cutting pattern, therewith taking the entire device out of production and requiring a roller for every pattern that is to be cut.

Patent publications JP 2014 008543, WO 2015 092935 and U.S. Pat. No. 5,365,816 describe devices according to the preamble of claim 1. However, in these publications, the module carriers are not arranged in line, substantially perpendicular to the direction of conveyance and the module carriers are not independently movable.

SUMMARY

It is therefore the goal of the present invention to cut dough pieces in a predetermined shape, that takes away the above disadvantages, and/or to provide a useful alternative to the state of the art.

These advantages and others are achieved, for example, by a device for cutting a dough piece that includes a first dough conveyor, for conveying at least one dough sheet with a speed of conveyance in a direction of conveyance that extends in a length direction of the first conveyor, a cutting station including a plurality of module carriers, in which each module carrier carrying a cutting module, said module for cutting dough sheets passing underneath the cutting station, and each module carrier is movable with a speed with at least a directional component in a width direction of the first conveyor, in which the speed of the module carriers is adjustable up to a value higher than the speed of conveyance and the module carriers are arranged in parallel, each of said module carriers movable over at least a section of the width of the first conveyor. All sections together preferably span over the entire width of the first conveyor, the module carriers are arranged in line, said line substantially perpendicular to the direction of conveyance, and each of said module carriers is independently movable.

These advantages and others are also achieved by a method for cutting a piece of dough that includes conveying at least one dough sheet on a conveyor and continuously cutting, with at least a directional component in the width direction of the conveyor, the at least one dough sheet, in that the continuously cutting comprises cutting with a plurality of cutting units, wherein the cutting units are independently moved.

BRIEF DESCRIPTION OF THE DRAWINGS

The invention will hereinafter be further elucidated according to the following figures, wherein.

DETAILED DESCRIPTION OF THE DRAWINGS

Figure 1:
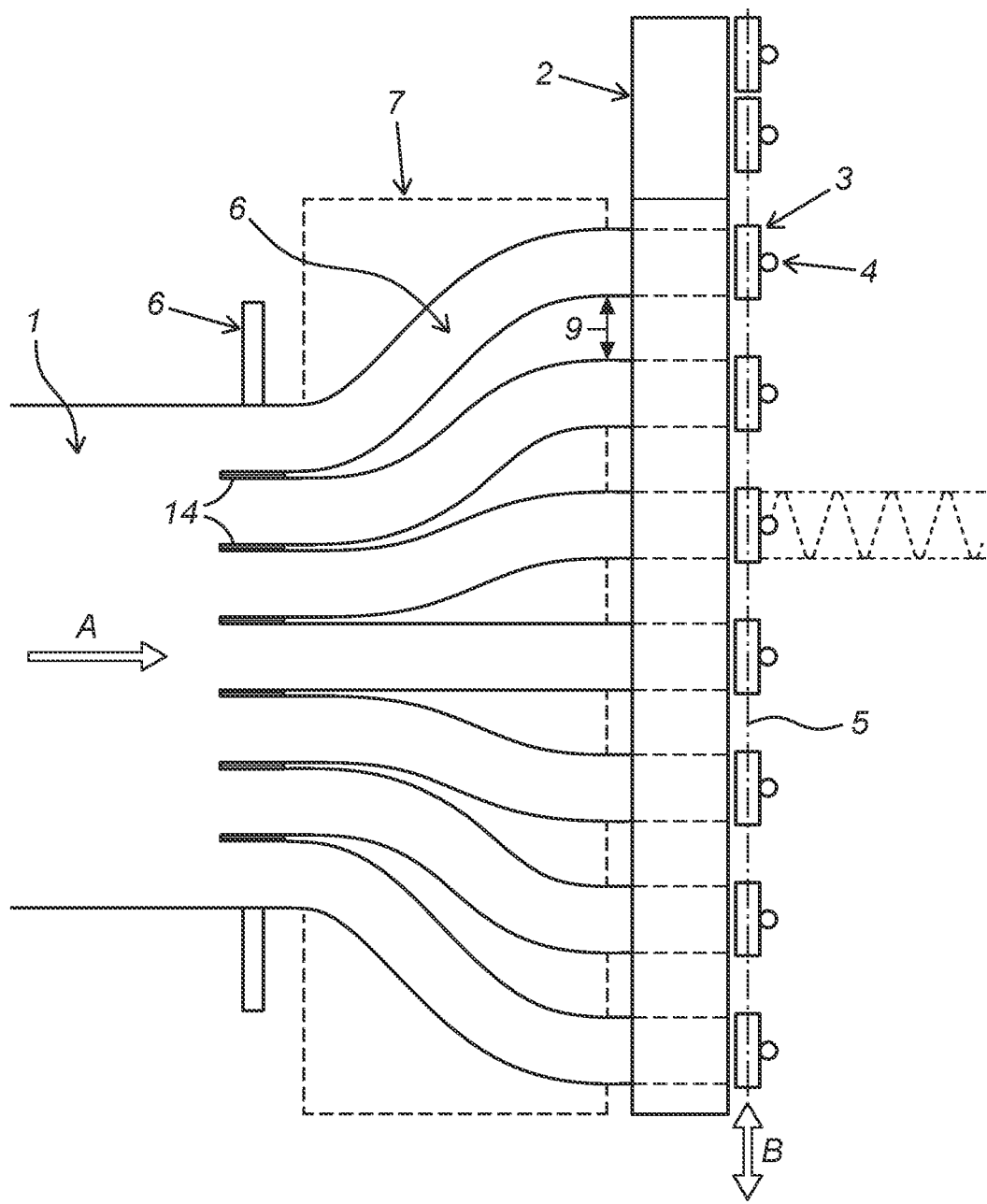
FIG. 1 shows a schematic representation of one particular embodiment of the invention.

The invention thereto proposes a device for cutting a dough piece comprising a first dough conveyor, for conveying at least one dough sheet with a speed of conveyance in a direction of conveyance that extends in a length direction of the first conveyor, a cutting station, comprising at least one module carrier, wherein said module carrier carrying a cutting module, said module for cutting dough sheets passing underneath the cutting station, and said module carrier is movable with a speed with at least a directional component in a width direction of the first conveyor, wherein the speed of the module carrier is adjustable up to a value higher than the speed of conveyance.

With such adjustable speed, cuts can be made in the dough with various shapes, in particular with angles of more than 45 degrees with respect to the direction of conveyance. Preferably the speed of the module carrier is a multiple of the speed of conveyance, in order to be able to approach angles of 90 degrees. For an exact angle of 90 degrees the conveyor may be temporally stopped. The device according to the invention is provided with cutters that are suitable for cutting a dough sheet with a directional component perpendicular to the direction of conveyance of said dough sheet.

The device thereby has the advantage to increase the possibility to change the shape in which dough pieces are cut. Due to the controllable movement of the module carriers on the cutting station, all kinds of cutting patterns and thus dough shapes can be realized.

In a further embodiment of the invention, the device further comprises a plurality of said module carriers, wherein the module carriers are arranged in parallel, each of said module carriers movable over at least a section of the width of the first conveyor, wherein all sections together preferably span over the entire width of the first conveyor. The device is thereto equipped with at least 2 module carriers, preferably at least 4, but more preferably the number of module carriers is regulated by a controller based on the amount of dough sheet streams. This allows for automatic adjustment which decreases the down time of the device and therewith increasing the devices' profitability. Additionally, this increases the flexibility of the forms that can be cut in the dough.

In a further embodiment the module carriers may be arranged in one line, said line substantially perpendicular to the direction of conveyance. This makes the device more compact.

In yet a further embodiment each of said module carriers is independently movable. This provides even more freedom in the shapes the dough pieces can be cut into. The controller may be configured for setting different variables for all module carriers, resulting in differently shaped cut pieces of dough.

In an alternative embodiment the device further comprises a width cutting station, configured to cut the dough sheet into multiple parallel lanes. The width cutting station may be located upstream of the cutting station, with respect to the direction of conveyance of the first conveyor. And the device may further comprise a dough lane spacer, configured for spacing lanes of dough with a predetermined spacing, located upstream with respect to the direction of conveyance of the first conveyor of the lateral cutting station and downstream with respect to the direction of conveyance of the width cutting station. The implementation of a width cutting station is beneficial for precise segmentation of the dough sheet into a plurality of dough lanes. This allows for parallel processing and hence a higher output of cut dough piece. The dough lane spacer ensures a clean separation of the dough lanes without dough lanes sticking to each other or the like. Preferably the dough lane spacer is embodied as a string conveyor, wherein a controller is configured to arrange the downstream ends of said strings according to the amount of dough lanes. This allows for use with any desired amount of dough lanes. The downstream ends of said strings can also be arranged to correspond to an amount of cutting wheels on the width cutting station.

In a further embodiment all sections over which the module carriers move are of substantially equal length. Thereby all lanes of dough can be individually cut into a predetermined shape.

The movement of the cutting module over the section and a dough conveyance speed, together determine the shape of the dough piece. If both speeds are proportional the sheet of dough is cut in the shape of a triangle.

In a different embodiment of the present invention the module carrier comprises at least one of the following cutting modules; a laser, a knife, a water jet, air yet, or a string, for cutting through the dough lanes. Preferably, the cutting module and the sheet of dough intersect on a point on a line, said line extending downwards from the cutting module, substantially perpendicular to the conveyor. Said intersecting cutting point avoids the sheet of dough being compressed and forming a mess on the conveyor. Preferably the device also comprises a grid, located below the cutting module to catch any torn dough remains whilst recycling for example the excess water in case of a water jet.

In yet another embodiment of the invention the position, in the length direction of the first dough conveyor, of the cutting module corresponds with a space between a first conveyor and a subsequent second conveyor, wherein the second conveyor is located at a distance, in the direction of the dough conveyance, from the first conveyor. The transition of the first conveyor to the second conveyor enables to catch the torn dough remains. Another benefit is the protection of the conveyor belts from the cutting module.

It might, in an alternative embodiment be necessary to provide a controller that is configured to maintain a controlled speed of the module carriers during the interaction of the cutting module with the sheet of dough. In case the predetermined shape of cut dough pieces is a equilateral triangle it is important to remain constant speeds of the module carriers in order to realize a clean cut. The controller may then be configured to maintain the constant speed in between the extreme points of the module carrier. Preferably the controller is configured to return a module carrier as quickly as possible at the first and/or second extreme point. The modules may be configured to obtain speeds up to 4 meter per second, and may in general be operated between 0.5 and 1 meter per second. In practice, a number of forward and return ways per minute may be set, for instance up to 300.

In another further embodiment the width cutting station comprises a plurality of cutting wheels, said cutting wheels rotatably attached to a common axis. Cutting wheels can be easily attached and detached to and from the common axis, thereby providing possibilities to configure the amount of parallel dough lanes according to the predetermined outcome.

In order to realize a cut the sheet of dough oriented in the desired direction the common axis is substantially perpendicular to the first direction of conveyance.

To make the module carriers compatible with the modular design of the width cutting station, the module carriers may comprise a docking position, located outside a working width, of the first and/or second conveyor, wherein the working width is formed by the span of all section. The docking station is preferably a location distal from the cutting station, but is not limited thereto. The docking station may in a non-limitative example be a track connected to the cutting station, providing the possibility to attach and detach module carriers whilst the device is in operation. This decreases the down time of the device. The working width can be contemplated as a part of the conveyor carrying dough.

The invention also comprises a method for cutting a piece of dough comprising the steps of: conveying at least one dough sheet on a conveyor characterised by, continuously cutting, with at least a directional component in the width direction of the conveyor, the at least one dough sheet, but preferably parallelly cutting a plurality of sheets of dough; and cutting the plurality of dough sheets using independently movable cutting modules; using a laser, a knife, a water jet, an air jet or a string, for cutting through the dough sheets.

FIG. 1 shows a device for cutting a dough piece comprising a first dough conveyor 1, for conveying at least one dough sheet in a direction of conveyance A that extends in a length direction of the first conveyor; characterised by, a cutting station 2, comprising at least one module carrier 3, wherein said module carrier carrying a cutting module 4, said module 4 for cutting dough sheets passing underneath the cutting station 2, and said module carrier 3 is movable with at least a directional component B in a width direction of the first conveyor 1. The module carriers 3 are arranged in line 5, said line 5 substantially perpendicular to the direction of conveyance A. Each of said module carriers 3 is independently movable. The device further comprises a width cutting station, configured to cut the dough sheet, located upstream of the cutting station 2, with respect to the direction of conveyance A of the first conveyor 1, in a plurality of parallel dough lanes 6 of substantially equal width; and a dough lane spacer 7, configured for spacing lanes 6 of dough with a predetermined spacing 9, located upstream with respect to the direction of conveyance A of the first conveyor 1 of the cutting station 2 and downstream with respect to the direction of conveyance A of the width cutting station. The width cutting station comprises a plurality of cutting wheels 14, said cutting wheels 14 rotatably attached to a common axis 6. The common axis 6 is substantially perpendicular to the first direction of conveyance A. The module carriers 3 comprise a docking position 15, located outside a working width of the first 1 and/or second 13 conveyor, wherein the working width of the first 1 and or second 13 conveyor preferably is the span of the dough covered conveyor section.

Figure 2:
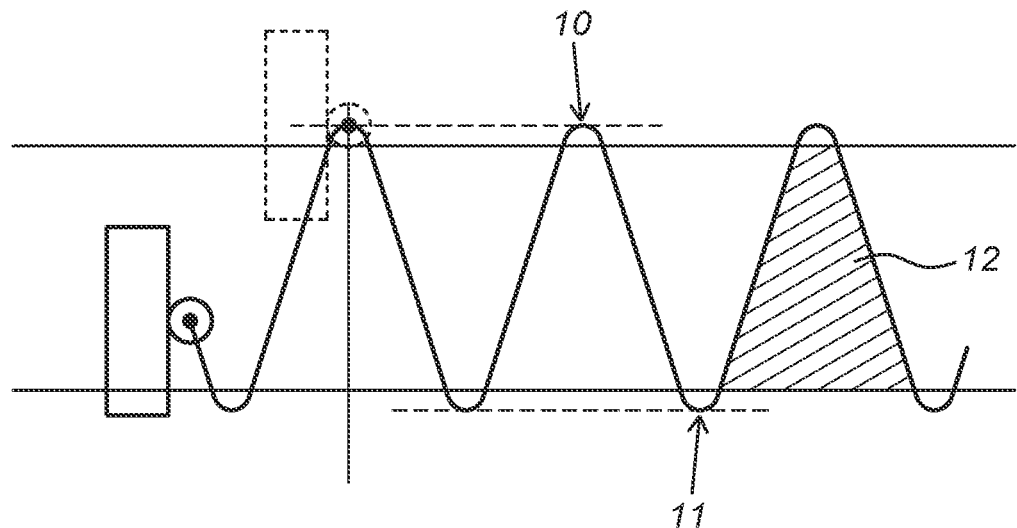
FIG. 2 shows an illustration of an example of a possible movement pattern of a single module carrier.

FIG. 2 shows an illustration of the movement of a single module carrier. Each module carrier 3 is configured to position the cutting module 4 in a first extreme position 10 and a second extreme position 11, wherein the shortest span between said first 10 and second 11 extreme positions is at least equally wide, but preferably wider than the distance between two subsequent predetermined spacings of the lanes of dough. The movement of the cutting module 4 from said first extreme position 10 to said second extreme position 11 and a dough conveyance speed, together form a predetermined shaped 12 dough piece. The module carrier 3 carries for example one of the following cutting modules 4; a laser, a knife, a water jet, an air jet or a string, for cutting through the dough lanes. A controller is configured to maintain a constant speed of the module carriers 3 during the interaction of the cutting module 4 with the sheet of dough.

Figure 3:
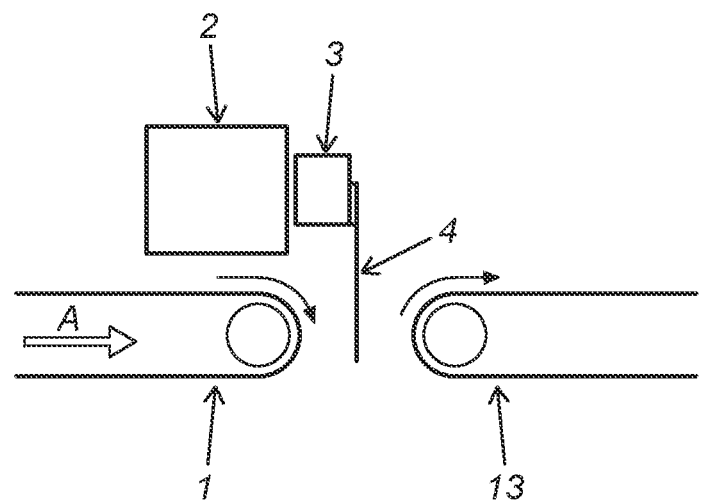
FIG. 3 shows an enlarged side view of the module carrier according to one embodiment.

FIG. 3 of the present invention displays the position, in the length direction of the first dough conveyor 1, of the cutting module 4 corresponds with a transition of the first conveyor 1 in a second conveyor 13, wherein the second conveyor 13 is located at a distance, in the direction of the dough conveyance A, from the first conveyor 1. The cutting module 4 extends between the distance between the first 1 and second conveyor 13.

The invention claimed is:

1. A device for cutting a dough piece comprising:
    a first dough conveyor, for conveying at least one dough sheet with a speed of conveyance in a direction of conveyance that extends in a length direction of the first conveyor; and
    a cutting station, comprising:
        a plurality of module carriers, wherein:
            each module carrier carrying a cutting module, said module for cutting dough sheets passing underneath the cutting station, and;
            each module carrier is movable with a speed with at least a directional component in a width direction of the first conveyor, wherein:
                the speed of the module carriers is adjustable up to a value higher than the speed of conveyance;
                the module carriers are arranged in parallel, each of said module carriers movable over at least a section of the width of the first conveyor, wherein all sections together span over the entire width of the first conveyor;
                the module carriers are arranged in line, said line substantially perpendicular to the direction of conveyance; and
                each of said module carriers is independently movable.

2. The device according to claim 1, wherein the device further comprises a width cutting station, configured to cut the dough sheet into a multiple parallel lanes, the width cutting station located upstream of the cutting station, with respect to the direction of conveyance of the first conveyor.

3. The device according to claim 2, comprising a dough lane spacer, configured for spacing lanes of dough with a predetermined spacing, located upstream of the cutting station in the direction of conveyance of the first conveyor and downstream of the width cutting station in the direction of conveyance.

4. The device according to claim 2, wherein all sections over which the module carriers move are of substantially equal length.

5. The device according to claim 4, wherein the movement of the cutting module over the section and a dough conveyance speed, together determine the shape of the dough piece.

6. The device according to claim 1, wherein the module carrier carries at least one of the following cutting modules; a laser, a knife, a water/air jet or a string, for cutting through the dough lanes.

7. The device according to claim 1, wherein the position, in the length direction of the first dough conveyor, of the cutting module corresponds with a space between a first conveyor and a subsequent second conveyor, wherein the second conveyor is located at a distance, in the direction of the dough conveyance, from the first conveyor.

8. The device according to claim 1, wherein a controller is configured to maintain a controlled speed of the module carriers during the interaction of the cutting module with the sheet of dough.

9. The device according to claim 2, wherein the width cutting station comprises a plurality of cutting wheels, said cutting wheels rotatably attached to a common axis.

10. The device according to claim 9, wherein the common axis is substantially perpendicular to the first direction of conveyance.

11. The device according to claim 1, wherein the module carriers comprise a docking position, located outside a working width of the first and/or second conveyor, wherein the working width is formed by the span of all section.

12. A dough line, comprising one or more devices according to claim 1.

* * * * *